No. 781,648. PATENTED FEB. 7, 1905.
D. F. GRAHAM & F. A. FOX.
CASING FOR COMPOUND MOTORS.
APPLICATION FILED APR. 1, 1903. RENEWED NOV. 10, 1904.

2 SHEETS—SHEET 1.

No. 781,648. PATENTED FEB. 7, 1905.
D. F. GRAHAM & F. A. FOX.
CASING FOR COMPOUND MOTORS.
APPLICATION FILED APR. 1, 1903. RENEWED NOV. 10, 1904.

2 SHEETS—SHEET 2.

No. 781,648.	Patented February 7, 1905.

UNITED STATES PATENT OFFICE.

DAVID F. GRAHAM AND FRANK A. FOX, OF STAMFORD, CONNECTICUT, ASSIGNORS, BY MESNE ASSIGNMENTS, TO THE EISENHUTH HORSELESS VEHICLE COMPANY, OF MIDDLETOWN, CONNECTICUT, A CORPORATION OF MAINE.

CASING FOR COMPOUND MOTORS.

SPECIFICATION forming part of Letters Patent No. 781,648, dated February 7, 1905.

Application filed April 1, 1903. Renewed November 10, 1904. Serial No. 232,138.

*To all whom it may concern:*

Be it known that we, DAVID F. GRAHAM and FRANK A. FOX, citizens of the United States, residing at Stamford, in the county of Fairfield and State of Connecticut, have invented certain new and useful Improvements in Casings for Compound Motors, of which the following is a specification.

Our invention relates to improvements in combustion-motors, and more particularly to an improved casing for containing the shafts of the motor.

One object of the invention is to provide an improved casing having a longitudinally-extending chamber offset therefrom and designed to contain a cam-shaft for operating the valves and so constructed and disposed with respect to the main portion of the casing that all oil splashed into the said offset and bearings by the movement of the cranks will drain back into the main portion of the casing.

A further object of the invention is to provide an improved casing forming a chamber for the crank-shaft of the motor, which casing is constructed in sections detachably secured together and arranged to clamp between them the bearings for the crank-shaft, the arrangement being such that the crank-shaft chamber may be opened without affecting the adjustment of the bearings on the shaft, thus permitting the employment of integral or undivided bushings carrying cone-bearings that can be adjusted without disturbing the joint in the casing; and a further object of the invention is to provide a two-part crank-shaft casing in the upper part of which the bearings for the shaft may be held to permit the shaft to be secured in place before the lower section is placed in position.

The invention also comprises other features, which will be hereinafter described, and the construction of the improved casing will be fully described in connection with the accompanying drawings, and its points of novelty will be particularly pointed out in the appended claim.

Figure 1:
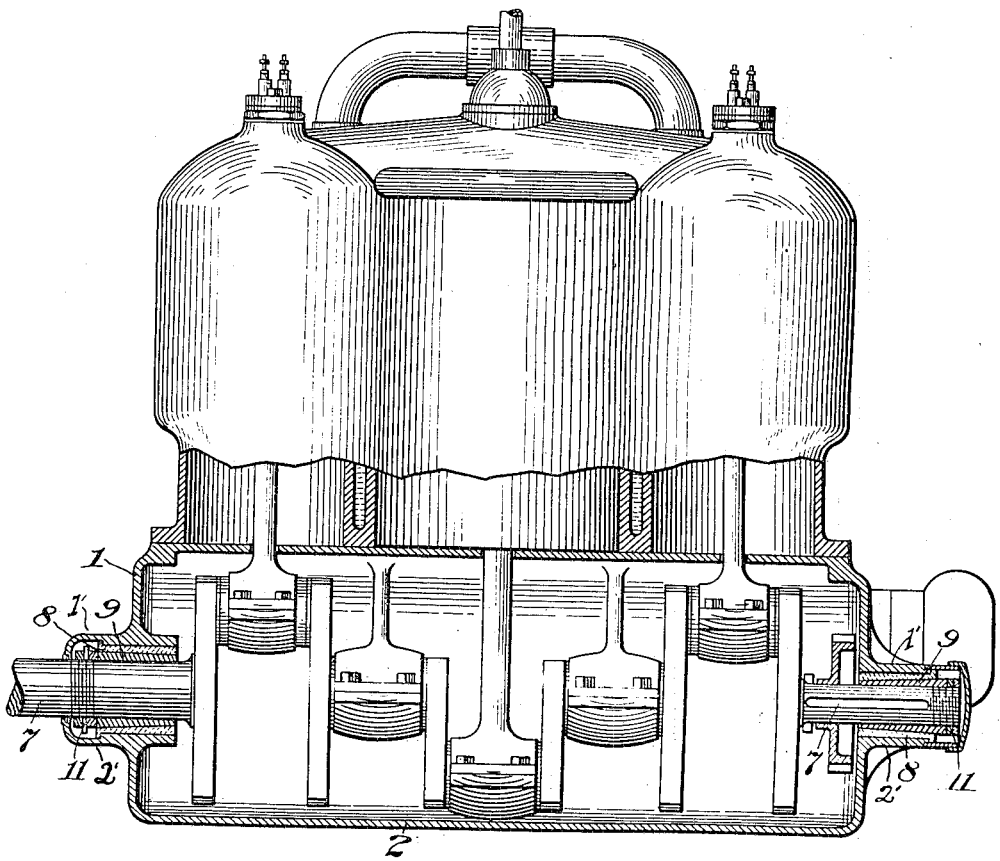
Figure 2:
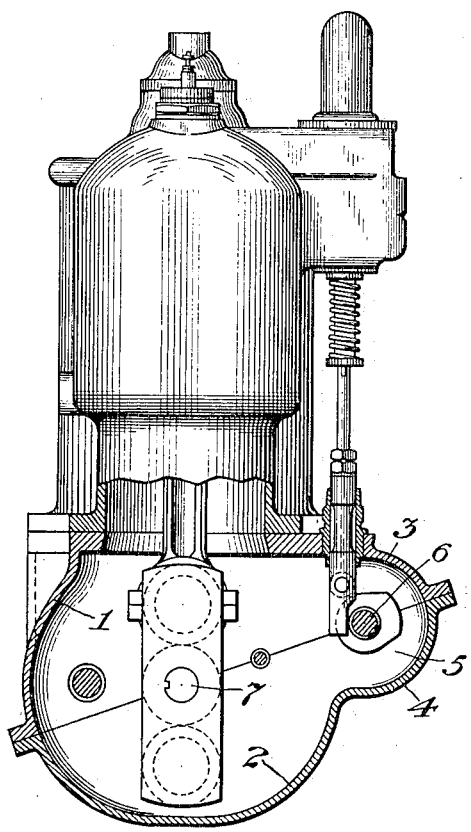

In the drawings, Figure 1 is a sectional elevation taken through the crank-shaft axis, and Fig. 2 is a sectional elevation taken at right angles to the shaft.

Corresponding parts in both figures are denoted by the same reference characters.

The crank-shaft chamber or casing of the motor comprises, as illustrated in the drawings, two sections detachably secured together—namely, an upper normally stationary section 1 and a lower removable section or cover 2—and each section is provided with a concavo-convex bulged extension, (designated, respectively, 3 and 4,) extending throughout the length of the casing and joined together or abutting, as shown, to form a longitudinally-extending chamber 5, offset from the main chamber and arranged to have mounted in it a cam-shaft 6, provided with the cams for operating the valves. Each section is provided at both ends with longitudinal extensions, (designated 1' and 2', respectively,) which extensions form boxes for the reception of the cone-bearings for the crank-shaft 7 of the motor, and said cone-bearings comprise sleeves 9, surrounding the shaft, and bushings 8, in turn surrounding the said sleeves. The sleeves 9 are screw-threaded on the shaft, so that they may be adjusted lengthwise of the latter to take up wear, and may be secured rigidly at the proper adjustment by set-screws 11 or other equivalent devices, and the bushings 8, which surround the sleeves, are clamped between the two sections 1 and 2 of the casing and are of course held by the casing against turning. The bearings formed by the bushings 8 and sleeves 9 being thus permanently mounted on the crank-shaft and all of said parts being held in the extensions 1', the lower section of the casing may be separated from the upper without disturbing the crank-shaft in its bearings, and, moreover, the crank-shaft may be removed, if desired, with the bearings on it and be put back in place without disturbing the adjustment of the bearings with respect to the shaft. As a result of this construction we secure great simplicity, economy, and compactness of construction, as well as convenience of access and the ability to separate the parts without danger of deranging the adjustment of the bearings.

We do not desire to be understood as limiting ourselves to the details of construction and arrangement as herein described and illustrated, as it is manifest that variations and modifications may be made in the features of construction and arrangement in the adaptation of the device to various conditions of use without departing from the spirit and scope of the invention and improvements. We therefore reserve the right to all such variations and modifications as properly fall within the scope of our invention and the terms of the following claim.

Having thus described our invention, we claim and desire to secure by Letters Patent—

A crank-shaft chamber or inclosing casing for combustion-motors, comprising as an entirety an upper section and a lower section, said sections detachably secured together, the upper section being provided with longitudinal extensions at its ends adapted to receive bearings for the crank-shaft, whereby the said crank-shaft may be placed therein before the lower section is secured to the upper section, and said lower section being also provided with longitudinal extensions and bearings clamped between said extensions, comprising a sleeve provided with interior screw-threads engaging screw-threads on the crank-shaft by which it can be adjusted thereon, means for securing it on said shaft, and a bushing on said sleeve held in fixed relation to the casing, substantially as described.

In testimony whereof we have signed our names in the presence of the subscribing witnesses.

DAVID F. GRAHAM.
FRANK A. FOX.

Witnesses:
FRANK OSGOOD McCLEARY,
JAMES CLARK PYBAS.